United States Patent
Sze (10) Patent No.: US 12,013,053 B2
(45) Date of Patent: Jun. 18, 2024

(54) TRANSMISSION PART, VALVE DRIVE ASSEMBLY AND VALVE

(71) Applicant: Chun Kuen Sze, Hong Kong (CN)

(72) Inventor: Chun Kuen Sze, Hong Kong (CN)

(*) Notice: Subject to any disclaimer, the term of this patent is extended or adjusted under 35 U.S.C. 154(b) by 359 days.

(21) Appl. No.: 17/297,970

(22) PCT Filed: Dec. 28, 2020

(86) PCT No.: PCT/CN2020/140121
§ 371 (c)(1),
(2) Date: May 27, 2021

(87) PCT Pub. No.: WO2022/126732
PCT Pub. Date: Jun. 23, 2022

(65) Prior Publication Data
US 2022/0403950 A1    Dec. 22, 2022

(30) Foreign Application Priority Data
Dec. 18, 2020   (CN) .......................... 202011501918.6

(51) Int. Cl.
F16K 31/53   (2006.01)
F16D 3/205   (2006.01)
F16K 31/05   (2006.01)

(52) U.S. Cl.
CPC .............. *F16K 31/53* (2013.01); *F16D 3/205* (2013.01); *F16K 31/055* (2013.01)

(58) Field of Classification Search
CPC .................................................. F16K 31/055
(Continued)

(56) References Cited

U.S. PATENT DOCUMENTS

2003/0066981 A1*  4/2003  Cross ..................... F16K 31/16
                                                   251/292
2012/0119131 A1*  5/2012  Strebe ................... F16K 31/04
                                                   251/356

(Continued)

FOREIGN PATENT DOCUMENTS

CN   204083437 U    1/2015
CN   204477467 U    7/2015
(Continued)

OTHER PUBLICATIONS

English Abstract of cited patent documents—2023.
(Continued)

*Primary Examiner* — Robert K Arundale
(74) *Attorney, Agent, or Firm* — Platinum Intellectual Property PC (57) ABSTRACT

The present disclosure relates to the technical field of pipeline equipment, and discloses a transmission part, a valve drive assembly and a valve. The valve drive assembly includes a first transmission part, a second transmission part and a driving part, the first transmission part is configured to be detachably connected with the rotating shaft of the valve; the second transmission part is in transmission connection with the first transmission part, and can move in an axial direction of the rotating shaft relative to the first transmission part; the driving part is used to drive the second transmission part to rotate so as to drive the first transmission part and the rotating shaft of the valve to rotate. With the application of the valve drive assembly of the present disclosure, even if the rotating shaft moves axially in the process of rotation, the first transmission part moves therewith, and can always maintain cooperation with the second transmission part, thus realizing the transmission between the two. Therefore, the valve drive assembly can be adapted to the axial displacement of the rotating shaft, and has better (Continued)

adaptability. The transmission part provided in the present disclosure can be applied to the above-mentioned valve drive assembly. The valve provided in the present disclosure includes the valve drive assembly described above.

11 Claims, 9 Drawing Sheets

(58) Field of Classification Search
USPC .............................................. 251/248, 250.5
See application file for complete search history.

(56) References Cited

U.S. PATENT DOCUMENTS

| | | | | |
|---|---|---|---|---|
| 2013/0015382 | A1* | 1/2013 | Thorpe | F16K 31/5286 251/304 |
| 2014/0326913 | A1 | 11/2014 | Führer | |
| 2017/0350525 | A1* | 12/2017 | Scaramucci | F16K 31/055 |
| 2018/0259982 | A1* | 9/2018 | Halimi | G05D 16/20 |
| 2022/0415546 | A1* | 12/2022 | Turek | F16D 1/101 |

FOREIGN PATENT DOCUMENTS

| | | |
|---|---|---|
| CN | 204493846 U | 7/2015 |
| CN | 206280593 U | 6/2017 |
| CN | 206555544 U | 10/2017 |
| CN | 207729009 U | 8/2018 |
| CN | 108775417 A | 11/2018 |
| CN | 110686123 A | 1/2020 |
| CN | 210069082 U | 2/2020 |
| CN | 111928005 A | 11/2020 |
| JP | H0914494 A | 1/1997 |
| WO | 2004090403 A1 | 10/2004 |

OTHER PUBLICATIONS

English translation of ISR of WO2022126732—2021.
English translation of Notification to Grant Patent Right for Invention of priority application CN2020115019186—2023.
English translation of OA1 of priority application of CN2020115019186—2023.
English translation of Written Opinion of The International Searching Authority of WO2022126732—2021.
First search of priority application CN2020115019186—2023.
International Search Report of WO2022126732—2020.
Notification to Grant Patent Right for Invention of priority application CN2020115019186—Dec. 28, 2022.
OA1 of priority application of CN2020115019186—2021.
Written Opinion of The International Searching Authority of WO2022126732—Aug. 26, 2021.

* cited by examiner

TRANSMISSION PART, VALVE DRIVE ASSEMBLY AND VALVE

RELATED APPLICATIONS

This application is a United States National Stage Application filed under 35 U.S.C 371 of PCT Patent Application Serial No. PCT/CN2020/140121, filed Dec. 28, 2020, which claims Chinese Patent Application Serial No. CN 2020115019186, filed Dec. 18, 2020, the disclosure of all of which are hereby incorporated by reference in their entirety.

TECHNICAL FIELD

The present disclosure relates to the technical field of pipeline equipment, and in particular to a transmission part, a valve drive assembly and a valve.

BACKGROUND ART

With the development of Internet of things and information technology, automatic control of valves in fluid pipelines or gas pipelines through a valve drive assembly has become a more common demand.

However, the existing valve drive assembly has poor adaptability, and cannot be used well in cooperating with the existing manual valves.

SUMMARY

One of the objects of the present disclosure includes providing a transmission part and a valve drive assembly to solve the problem of poor adaptability of the existing valve drive assembly. The object of the present disclosure also includes providing a valve including the above-mentioned valve drive assembly.

The embodiments of the present disclosure are implemented in the following ways.

A valve drive assembly, used for driving a rotating shaft of a valve to rotate, including:

a first transmission part, the first transmission part being configured to be detachably connected with the rotating shaft of the valve;

a second transmission part, the second transmission part being in transmission connection with the first transmission part, and can move in an axial direction of the rotating shaft relative to the first transmission part; and a driving part, the driving part being in transmission connection with the second transmission part, and the driving part being configured to drive the second transmission part to rotate so as to drive the first transmission part and the rotating shaft of the valve to rotate.

In an optional embodiment, the first transmission part is provided with a first hole in which the rotating shaft is inserted.

In an optional embodiment, the second transmission part has a second hole, the second transmission part is configured to be sheathed on an outer side of the first transmission part through the second hole, one of the outer side of the first transmission part or an inner side of the second transmission part is provided with a guide structure, the other is provided with a guide groove, an extending direction of the guide groove is consistent with an extending direction of an axis of the rotating shaft, and the guide structure is in sliding fit with the guide groove.

In an optional embodiment, the first transmission part includes a body and the guide structure protruding on an outer side of the body, the guide structure includes a mounting column protruding on the outer side of the body and a roller arranged on the mounting column, and the guide structure is configured to extend into the guide groove so that the roller can roll on an inner wall of the guide groove.

In an optional embodiment, an outer peripheral side of the body is a cylindrical surface, and a plurality of the guide structures are arranged at intervals around the outer peripheral side of the body.

In an optional embodiment, the mounting column coincides with an axis of the roller, and is perpendicular to the axis of the rotating shaft.

In an optional embodiment, an outer side of the second transmission part is provided with a clamping slot, the valve drive assembly also includes a third transmission part, the third transmission part has a third hole, an inner side of the third hole is provided with a bulge, the third transmission part is sheathed on the outer side of the second transmission part through the third hole, and the bulge is matched with the clamping slot, and the third transmission part is in transmission connection with the driving part.

In an optional embodiment, the second transmission part is cylindrical, the outer side of the second transmission part is provided with a plurality of clamping slots, a plurality of the clamping slots are arranged at intervals around an outer peripheral surface of the second transmission part, and the clamping slots extend along an axial direction of the second transmission part.

In an optional embodiment, an outer side of the third transmission part is provided with a tooth surface, and the tooth surface is in transmission connection with the driving part.

In an optional embodiment, the tooth surface of the third transmission part is a conical tooth surface.

In an optional embodiment, the valve drive assembly also includes a support part, the support part is configured to connect a valve body of the valve and/or a pipeline provided with the valve, and the driving part is provided on the support part.

In an optional embodiment, the support part has an accommodating cavity, and the first transmission part and the second transmission part are accommodated in the accommodating cavity.

In an optional embodiment, the support part is provided with a snap-fit for connecting the pipeline and/or the valve body.

In an optional embodiment, the first transmission part and the second transmission part are both gears and mesh with each other, and the rotation axes of the first transmission part and the second transmission part are parallel to each other.

In an optional embodiment, the first transmission part and the second transmission part are both helical gears.

In an optional embodiment, an output shaft of the driving part is coaxial with the second transmission part.

In an optional embodiment, the valve drive assembly also includes a first bevel gear coaxially provided with the second transmission part, a second bevel gear is coaxially provided on the output shaft of the driving part, and the second bevel gear is meshed with the first bevel gear.

In an optional embodiment, the valve drive assembly also includes a housing, and the first transmission part and the second transmission part are accommodated in the housing.

A valve, includes the valve drive assembly described in any one of the above embodiments.

A transmission part, applied to a valve drive assembly, includes a body and a guide structure protruding on an outer side of the body, wherein the body is used to be connected with a rotating shaft of a valve; the guide structure is configured for matching with a guide groove on an external mating part, so as to realize that the mating part can drive the body and the rotating shaft of the valve to rotate through the guide structure, and can slide in an axial direction of the rotating shaft relative to the transmission part.

In an optional embodiment, the guide structure includes a mounting column protruding on the outer side of the body and a roller arranged on the mounting column, and the guide structure is configured to extend into the guide groove so that the roller can roll on an inner wall of the guide groove.

In an optional embodiment, an outer peripheral side of the body is a cylindrical surface, and a plurality of the guide structures are arranged at intervals around the outer peripheral side of the body.

In an optional embodiment, the body has a hole extending axially, which is used to sheath on the outer side of the rotating shaft of the valve, and the mounting column coincides with an axis of the roller and is perpendicular to an axis of the body.

The embodiments of the present disclosure include, for example, following beneficial effects.

The valve drive assembly provided by the embodiments of the present disclosure includes the first transmission part, the second transmission part and the driving part, the first transmission part is configured to be detachably connected with the rotating shaft of the valve; the second transmission part is in transmission connection with the first transmission part, and can move in the axial direction of the rotating shaft relative to the first transmission part; and the driving part is in transmission connection with the second transmission part, the driving part is configured to drive the second transmission part to rotate so as to drive the first transmission part and the rotating shaft of the valve to rotate. By enabling the first transmission part to move relative to the second transmission part in the axial direction of the rotating shaft, even if the rotating shaft rises and lowers in the axial direction during the rotation, the first transmission part moves therewith, and it can always maintain cooperation with the second transmission part, thus realizing the transmission between the two. Therefore, the valve drive assembly provided by the embodiment of the present disclosure can be adapted to the axial displacement of the rotating shaft, and has better adaptability. The transmission part provided in the embodiments of the present disclosure is used to achieve the above-mentioned beneficial effects.

The valve provided by the embodiments of the present disclosure includes the above-mentioned valve drive assembly, and therefore has the above-mentioned beneficial effects.

Reference signs: 1—pipeline structure; 10—valve; 11—pipeline; 100—valve drive assembly; 110—first transmission part; 111—body; 1111—first hole; 112—mounting column; 113—roller; 120—second transmission part; 121—second hole; 122—guide groove; 123—clamping slot; 130—third transmission part; 131—third hole; 132—bulge; 140—driving part; 150—support part; 151—accommodating cavity; 152—snap-fit; 160—first bevel gear; 170—second bevel gear; 180—housing; 200—valve body; 210—rotating shaft.

DETAILED DESCRIPTION OF EMBODIMENTS

Existing automatic regulating valves usually use a valve drive assembly to drive the rotation of a rotating shaft of the valve, thereby driving a valve clack in a valve body to rotate, so as to realize the flowing or blocking of fluid in the valve body. In some cases, when the rotating shaft rotates, it may be accompanied by axial movement, which easily causes the existing valve drive assembly to be unable to be adapted to the axial movement of the rotating shaft, and thus cannot drive the rotating shaft well. Therefore, some existing valve drive assemblies have the problem of poor adaptability.

In order to solve at least one of the above-mentioned problems in the prior art, an embodiment of the present disclosure provides a valve drive assembly, transmission parts of which can slide relative to each other, so as to be adapted to the axial displacement of the rotating shaft. In addition, an embodiment of the present disclosure also provides a valve including the valve drive assembly described above, and a pipeline structure including the valve. An embodiment of the present disclosure also provides a transmission part that can be applied to the above-mentioned valve drive assembly.

In order to make the purpose, technical solutions and advantages of the embodiments of the present disclosure clearer, the technical solutions in the embodiments of the present disclosure will be described clearly and completely in conjunction with the accompanying drawings in the embodiments of the present disclosure. Obviously, the described embodiments are a part of the embodiments of the present disclosure, but not all of the embodiments. The components of the embodiments of the present disclosure generally described and shown in the drawings herein may be arranged and designed in various different configurations.

Therefore, the following detailed description of the embodiments of the present disclosure provided in the accompanying drawings is not intended to limit the claimed scope of the present disclosure, but merely represents selected embodiments of the present disclosure. Based on the embodiments of the present disclosure, all other embodiments obtained by those ordinary skilled in the art, without making inventive effort, fall within the protection scope of the present disclosure.

It should be noted that similar reference numerals and letters indicate similar items in the following accompanying drawings. Therefore, once a certain item is defined in one drawing, it does not need to be further defined and explained in the subsequent drawings.

In the description of the present disclosure, it should be noted that the orientation or positional relationship indicated by the terms "upper", "lower", "inner", "outer" etc. are based on the orientation or positional relationship as shown in the accompanying drawings, or it is the orientation or positional relationship that the product of the invention is usually placed in use, merely for facilitating the description of the present disclosure and simplifying the description, rather than indicating or implying that related devices or elements have to be in the specific orientation, or configured or operated in a specific orientation, therefore, they should not be construed as limitations on the present disclosure.

Besides, terms "first", "second" and "third", if appear, are merely for distinguishing the description, but should not be construed as indicating or implying relative importance.

It should be noted that the features in the embodiments of the present disclosure can be combined with each other without conflict.

Figure 1:
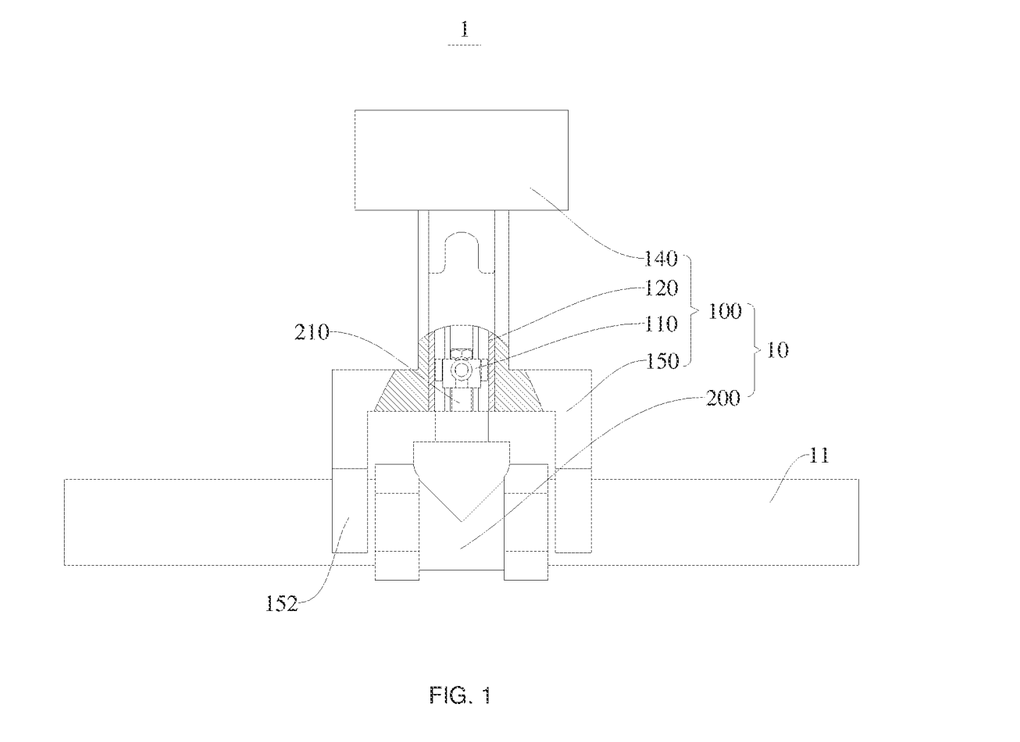
FIG. 1 is a partial schematic view of a pipeline structure in an embodiment of the present disclosure.
Figure 2:
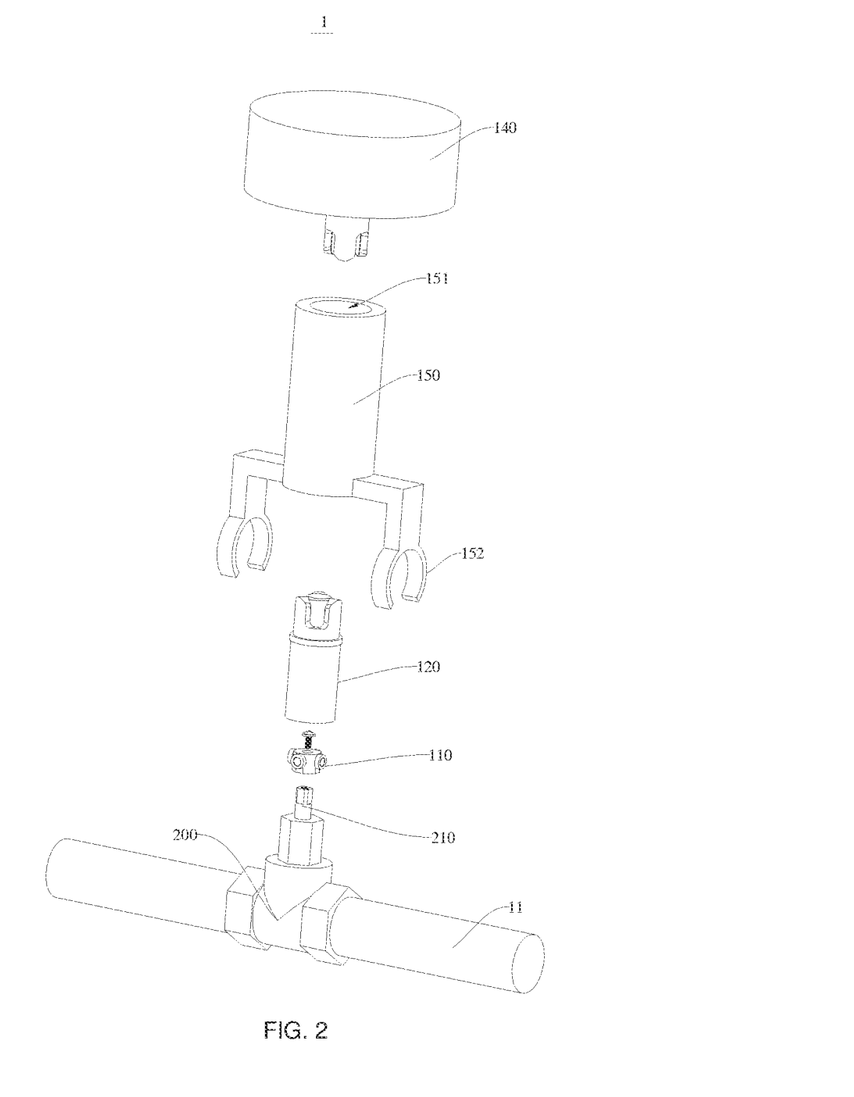
FIG. 2 is an exploded view of the pipeline structure in an embodiment of the present disclosure.
Figure 3:
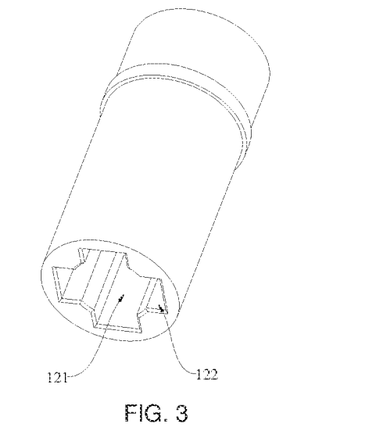
FIG. 3 is a schematic view of a second transmission part of a transmission assembly in an embodiment of the present disclosure.
Figure 4:
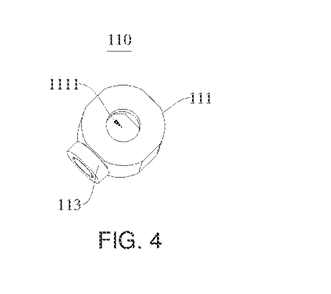
FIG. 4 to FIG. 7 are schematic views of a first transmission part in several different embodiments of the present disclosure.
Figure 5:
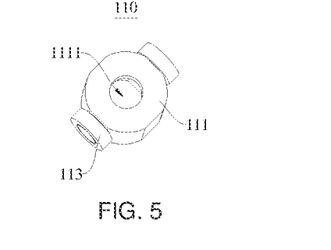
Figure 6:
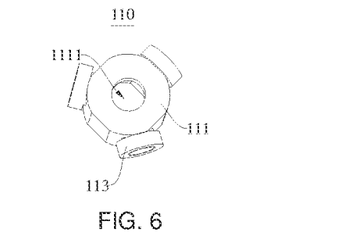

FIG. 1 is a partial schematic view of a pipeline structure 1 in an embodiment of the present disclosure; FIG. 2 is an exploded view of the pipeline structure 1 in an embodiment of the present disclosure; and FIG. 3 is a schematic view of a second transmission part 120 of a transmission assembly in an embodiment of the present disclosure. Referring to FIG. 1 to FIG. 3, in the embodiments of the present disclosure, a valve 10 is mounted in a pipeline 11, which pipeline 11 can transport both gas and liquid. The valve 10 includes a valve drive assembly 100, a valve body 200, a valve clack (not shown in the figure) arranged in the valve body 200, and a rotating shaft 210 connected to the valve clack and extending out from the valve body 200. The valve drive assembly 100 is in transmission connection with the rotating shaft 210 to drive the rotating shaft 210 to rotate to drive the valve clack to rotate, thereby realizing the flowing or blocking of the fluid in the valve body 200. It can be understood that in the valve 10 provided by the embodiment of the present disclosure, the valve body 200, the valve clack, and the rotating shaft 210 can be obtained by removing a handle on the rotating shaft 210 from the existing manual valve 10, that is, the valve drive assembly 100 provided in the embodiment of the present disclosure can be mounted on some existing manual valves 10 (with the handle on the rotating shaft 210 removed). Therefore, the valve drive assembly 100 provided by the embodiment of the present disclosure can also be used to conveniently modify the conventional manual valves 10 to enable the same to have an automatic switch function.

The valve drive assembly 100 provided in the embodiment of the present disclosure includes a first transmission part 110, a second transmission part 120, and a driving part 140. The first transmission part 110 is configured to be detachably connected with the rotating shaft 210 of the valve 10; the second transmission part 120 is in transmission connection with the first transmission part 110, and can move in an axial direction of the rotating shaft 210 relative to the first transmission part 110; the driving part 140 is in transmission connection with the second transmission part 120, the driving part 140 is configured to drive the second transmission part 120 to rotate so as to drive the first transmission part 110 and the rotating shaft 210 of the valve 10 to rotate, and finally realize the opening or closing of the valve 10. As the first transmission part 110 and the second transmission part 120 can move relatively, the first transmission part 110 can produce corresponding sliding with the second transmission part 120 even if the rotating shaft 210 is axially displaced, in the process that the valve drive assembly 100 drives the rotation of the rotating shaft 210, but the matching relationship is still maintained without affecting the transmission. Therefore, the valve drive assembly 100 provided by the embodiment of the present disclosure has good adaptability.

As shown in FIG. 2, the first transmission part 110 has a first hole 1111 for being sheathed on the rotating shaft 210. Optionally, the cross-sectional profile of the first hole 1111 is non-circular and matches the cross-sectional shape of the rotating shaft 210, so that the first transmission part 110 cannot rotate relative to the rotating shaft 210 after being sheathed on the rotating shaft 210, and the rotation of the first transmission part 110 will surely drive the rotating shaft 210 and the valve clack in the valve body 200 to rotate. Optionally, the first transmission part 110 may be pressed tightly by a nut to avoid the axial displacement relative to the rotating shaft 210.

In the present embodiment, optionally, the second transmission part 120 has a second hole 121, and the second transmission part 120 is configured to be sheathed on an outer side of the first transmission part 110 through the second hole 121. One of the outer side of the first transmission part 110 or an inner side of the second transmission part 120 is provided with a guide structure, and the other is provided with a guide groove 122. An extending direction of the guide groove 122 is consistent with an extending direction of and axis of the rotating shaft 210, and the guide structure is in sliding fit with the guide groove 122. By the relative sliding between the guide groove 122 and the guide structure, the axial displacement between the first transmission part 110 and the second transmission part 120 is realized. In cases where the first transmission part 110 is fixedly mounted on the rotating shaft 210, when the second transmission part 120 moves relative to the first transmission part 110, a moving direction thereof is consistent with the extending direction of the axis of the rotating shaft 210.

In the present embodiment, the second transmission part 120 is cylindrical, so that the second hole 121 is formed in the middle portion for the first transmission part 110 to be sheathed. It should be understood that the second hole 121 of the second transmission part 120 may be a through hole or a blind hole. An end portion of the second transmission part 120 is in transmission connection with the driving part 140.

Figure 7:
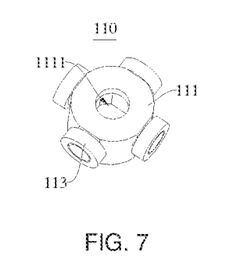
Figure 8:
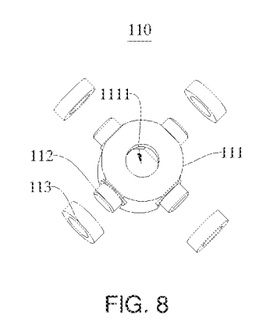
FIG. 8 is an exploded view of the first transmission part of the transmission assembly in an embodiment of the present disclosure.
Figure 9:
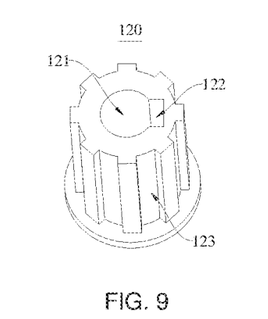
FIG. 9 to FIG. 12 are schematic views of the second transmission part in several different embodiments of the present disclosure.
Figure 10:
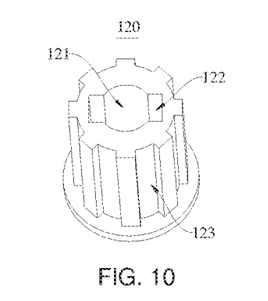
Figure 11:
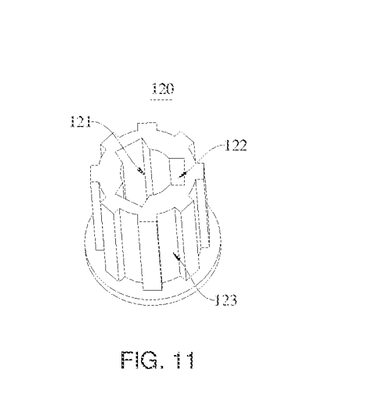
Figure 12:
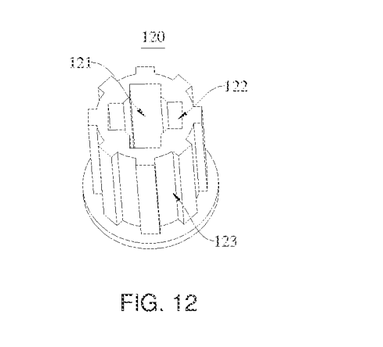

FIG. 4 to FIG. 7 are schematic views of the first transmission part 110 in several different embodiments of the present disclosure; and FIG. 8 is an exploded view of the first transmission part 110 of the transmission assembly in an embodiment of the present disclosure. Specifically, FIG. 8 is an exploded view of the first transmission part 110 in the embodiment shown in FIG. 7. As shown in FIG. 4 to FIG. 8, in these embodiments, the guide structure is located on the first transmission part 110, and the guide groove 122 is located in the second transmission part 120. The number of guide structures can be set as required, which can be one, two, three, four or more. Of course, in other optional embodiments, the guide groove 122 can also be arranged in the first transmission part 110, and the guide structure can be arranged on the second transmission part 120.

In this embodiment, the first transmission part 110 includes a body 111 and the guide structure protruding on an outer side of the body 111. The body 111 is used to connect with the rotating shaft of the valve; the guide structure is configured to match with the guide groove (the guide groove 122 inside the second transmission part 120 in the embodiment of the present disclosure) on an external mating part, so as to realize that the mating part can drive the body 111 and the rotating shaft of the valve to rotate through the guide structure, and can slide in the axial direction of the rotating shaft relative to the first transmission part 110. In the present embodiment, the guide structure includes a mounting column 112 protruding on the outer side of the body 111 and a roller 113 arranged on the mounting column 112. The guide structure is configured to extend into the guide groove 122 so that the roller 113 can roll on an inner wall of the guide groove 122. When the valve drive assembly 100 drives the rotating shaft 210 to rotate, if the rotating shaft 210 moves axially (such as ascending or descending), the first transmission part 110 will also move axially with the rotating shaft 210, thereby sliding relative to the second transmission part 120, but it still keeps matching with the second transmission part 120, therefore it does not affect the transmission. By providing the roller 113, the resistance of the guide structure moving along the guide groove 122 can be reduced. Optionally, the roller 113 may be a bearing. It should be understood that, in some other embodiments, the guide structure may only be a bump or a boss without the roller 113, especially when the friction coefficient between the guide structure and the inner wall of the guide groove 122 is relatively small, the roller 113 can be omitted to save the cost.

Optionally, an outer peripheral side of the body 111 is a cylindrical surface, and when the first transmission part 110 includes a plurality of guide structures, the plurality of guide structures are arranged at intervals around the outer peripheral side of the body 111. Optionally, a plurality of guide structures may be uniformly or non-uniformly arranged around the outer peripheral side of the body 111. As shown in the figure, the body 111 has the first hole 1111 extending in the axial direction, so that the body is formed into a cylindrical shape for sheathing on outer side of the rotating shaft of the valve. In various embodiments of FIG. 1 to FIG. 8, the mounting column 112 coincides with the axis of the roller 113 and is perpendicular to the axis of the body 111, that is, perpendicular to the axis of the rotating shaft 210, so that the roller 113 rolls on the side wall of the guide groove 122. In other optional embodiments, the axis of the roller 113 may also be perpendicular to the rotating shaft 210 and the mounting column 112, so that when the first transmission part 110 and the second transmission part 120 slide relative to each other, the roller 113 rolls at the bottom of the guide groove 122.

The first transmission part 110 used in the embodiment of FIG. 1 to FIG. 3 is the first transmission part 110 in the embodiment shown in FIG. 7. It should be understood that the first transmission part 110 in any one of the embodiments shown in FIG. 4 to FIG. 7 can be selected in other optional embodiments, or the guide structure included in the first transmission part 110 can be further added. Accordingly, the second transmission part 120 matching the first transmission part 110 should be selected so that the number of guide structures and the number of guide grooves 122 are the same.

FIG. 9 to FIG. 12 are schematic views of the second transmission part 120 in several different embodiments of the present disclosure, corresponding to the first transmission part 110 provided in the embodiments of FIG. 4 to FIG. 7 respectively.

Figure 13:
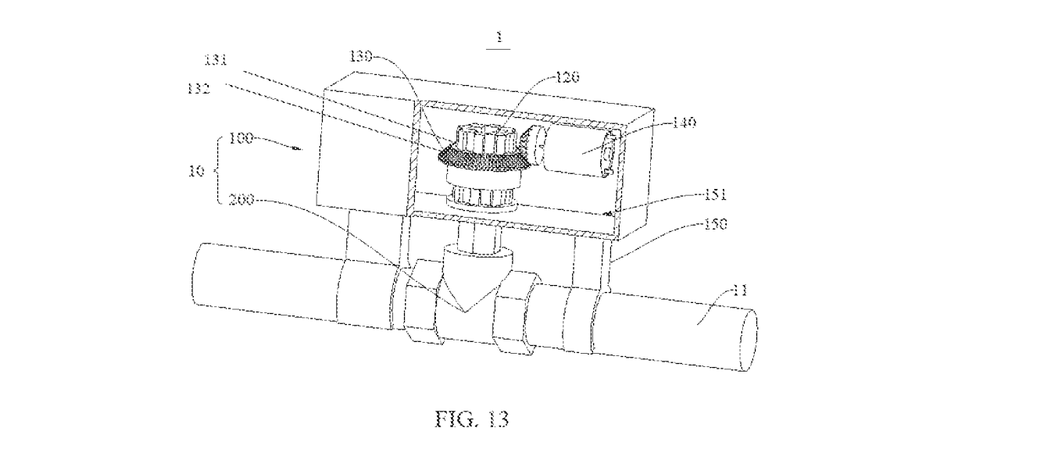
FIG. 13 is a partial schematic view of the pipeline structure in another embodiment of the present disclosure.
Figure 14:
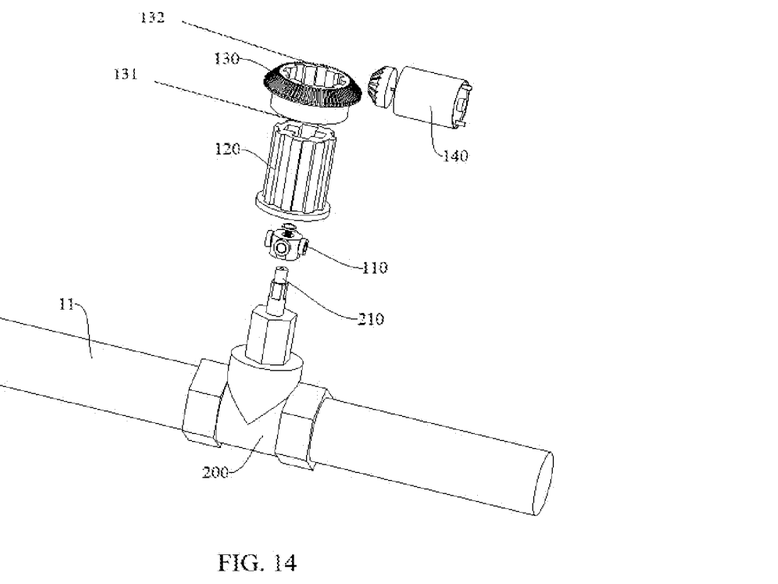
FIG. 14 is an exploded view of a valve drive assembly in another embodiment of the present disclosure.

FIG. 13 is a partial schematic view of the pipeline structure 1 in another embodiment of the present disclosure; and FIG. 14 is an exploded view of the valve drive assembly 100 in another embodiment of the present disclosure. Referring to FIG. 13 and FIG. 14, and in conjunction with FIG. 12, in an optional embodiment, the outer side of the second transmission part 120 is provided with a clamping slot 123, the valve drive assembly 100 also includes a third transmission part 130, the third transmission part 130 has a third hole 131, an inner side of the third hole 131 is provided with a bulge 132, the third transmission part 130 is sheathed on the outer side of the second transmission part 120 through the third hole 131, and the bulge 132 is matched with the clamping slot 123, and the third transmission part 130 is in transmission connection with the driving part 140. By providing the third transmission part 130, the transmission relationship between the second transmission part 120 and the driving part 140 can be adjusted, and the transmission connection between the second transmission part 120 and the driving part 140 is realized by the third transmission part 130. The third transmission part 130 and the second transmission part 120 are matched by the clamping slot 123 and the bulge 132, so that the third transmission part 130 and the second transmission part 120 can slide relative to each other in the axial direction, but cannot rotate relative to each other. The third transmission part 130 can drive the second transmission part 120 to rotate. Optionally, the second transmission part 120 is cylindrical, a plurality of clamping slots 123 are arranged at intervals around the outer peripheral surface of the second transmission part 120, and the clamping slots 123 extend along the axial direction of the second transmission part 120. Optionally, the plurality of clamping slots 123 may be evenly spaced apart. In the present embodiment, the third hole 131 may be a through hole or a blind hole.

By providing the clamping slot 123 and the bulge 132, the second transmission part 120 can move in the axial direction relative to the third transmission part 130. Therefore, when the driving part 140, the first transmission part 110, and the third transmission part 130 are fixed, the position of the second transmission part 120 relative to the third transmission part 130 can be adjusted, so that it can be in transmission connection with the first transmission part 110 while being connected to the third transmission part 130. For example, when the rotating shaft 210 of the valve 10 is short, the second transmission part 120 can move a certain distance in a direction closer to the valve body 200 relative to the third transmission part 130, so that it is fit with the first transmission part 110 on rotating shaft 210.

As shown in FIG. 13 and FIG. 14, a tooth surface is provided on the outer side of the third transmission part 130, and the tooth surface is in transmission connection with the driving part 140. In an optional embodiment, the tooth surface of the third transmission part 130 is a conical tooth surface; and an output shaft of the driving part 140 is also matched with the conical tooth surface of the third transmission part 130 through a bevel gear. Through this arrangement method, the output shaft of the driving part 140 and the rotating shaft 210 can have a certain angle (for example, being perpendicular to each other), so as to reduce the overall height of the valve 10, reduce the space occupation, and meanwhile also meet the layout requirements of the driving part 140 in some cases.

Figure 15:
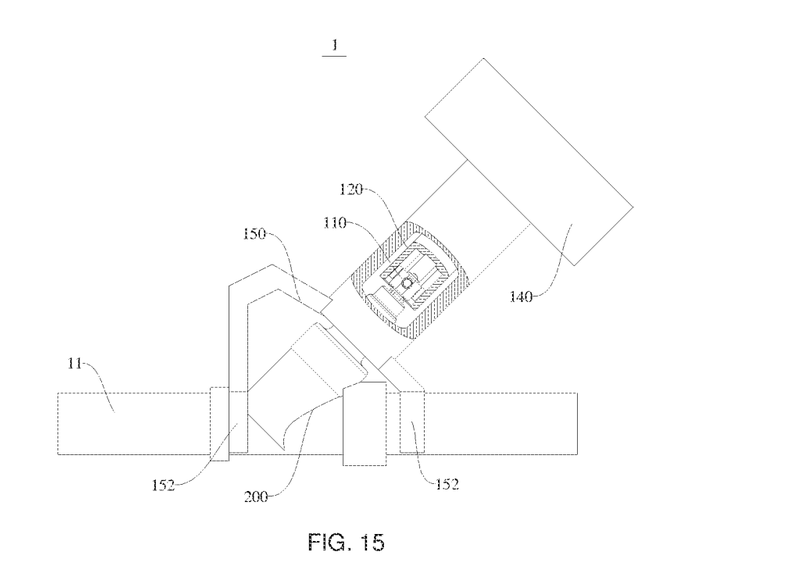
FIG. 15 is a schematic view showing inclined arrangement of the valve drive assembly and a rotating shaft of a valve in an embodiment of the present disclosure.

The rotating shaft 210 of the valve 10 provided in the embodiment of FIG. 1 and FIG. 13 is approximately perpendicular to the pipeline 11. In an optional embodiment, the rotating shaft 210 can also be inclined at an acute angle relative to the pipeline 11, as shown in FIG. 15.

As shown in FIG. 1 and FIG. 13, optionally, the valve drive assembly 100 can also include a support part 150, which support part 150 is used to connect with the valve body 200 of the valve 10 and/or the pipeline 11 provided with the valve 10, the driving part 140 is arranged on the support part 150. The support part 150 can be used to support and fix the driving part 140. In addition, the support part 150 can also be used to protect the transmission part. Optionally, as shown in FIG. 1 and FIG. 13, the support part 150 also has an accommodating cavity 151, and the first transmission part 110 and the second transmission part 120 are contained in the accommodating cavity 151. Optionally, the driving part 140 can also be fixed on the wall surface of the accommodating cavity 151, as shown in FIG. 13.

In an optional embodiment, the support part 150 is provided with a snap-fit 152 for connecting the pipeline 11 and/or the valve body 200. As shown in FIG. 1 and FIG. 13, the support part 150 is fixed on the pipeline 11 by two snap-fits 152; and in FIG. 9, the two snap-fits 152 of the support part 150 are respectively fixed on the valve body 200 and the pipeline 11.

Figure 16:
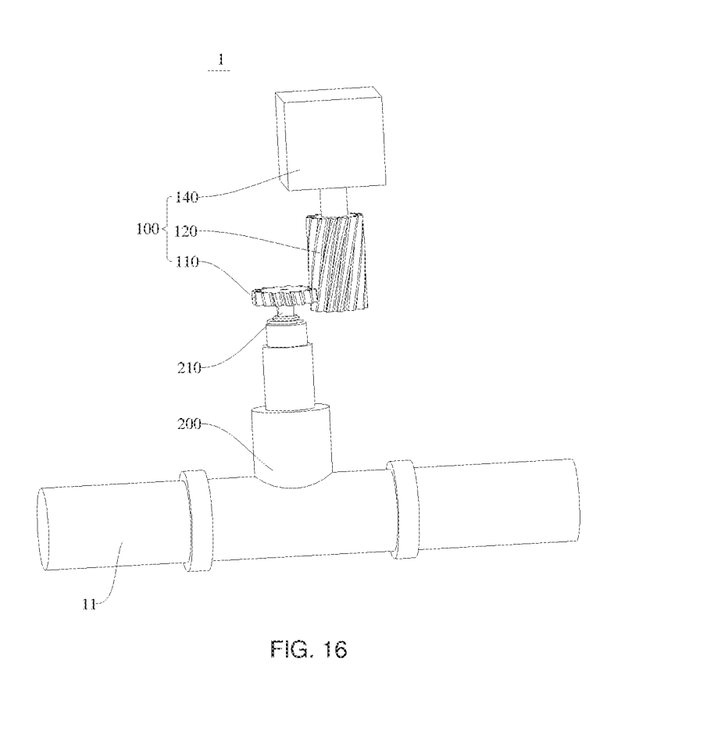
FIG. 16 is a partial schematic view of the pipeline assembly in yet another embodiment of the present disclosure.

FIG. 16 is a partial schematic view of the pipeline 11 assembly in yet another embodiment of the present disclosure. As shown in FIG. 16, optionally, the first transmission part 110 and the second transmission part 120 are both gears and mesh with each other, and rotation axes of the first transmission part 110 and the second transmission part 120 are parallel to each other. By arranging the first transmission part 110 and the second transmission part 120 as two gears with parallel axes and meshing with each other, the axial sliding movement between the first transmission part 110 and the second transmission part 120 can also be realized, therefore it can also be adapted to the axial movement of the rotating shaft 210 of the valve 10 during the rotation.

In an optional embodiment, the output shaft of the driving part 140 is coaxial with the second transmission part 120, which can improve the transmission efficiency. Arranging the first transmission part 110 and the second transmission part 120 as helical gears can make the transmission more stable and can bear greater load.

Figure 17:
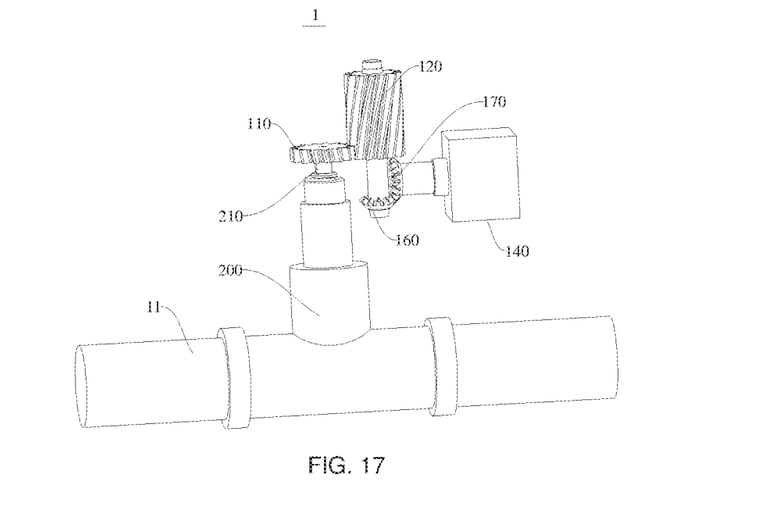
FIG. 17 is a variation of the valve drive assembly in the embodiment of FIG. 16 of the present disclosure.

FIG. 17 is a variation of the valve drive assembly 100 in the embodiment of FIG. 16 of the present disclosure. As shown in FIG. 17, in order to reduce the overall height of the valve 10, the valve drive assembly 100 may also include a first bevel gear 160 arranged coaxially with the second transmission part 120, and the output shaft of the driving part 140 is coaxially provided with a second bevel gear 170, and the second bevel gear 170 is meshed with the first bevel gear 160. Optionally, the first bevel gear 160 is provided at an end of the second transmission part 120 close to the pipeline 11, so as to better reduce the overall height of the valve 10.

Figure 18:
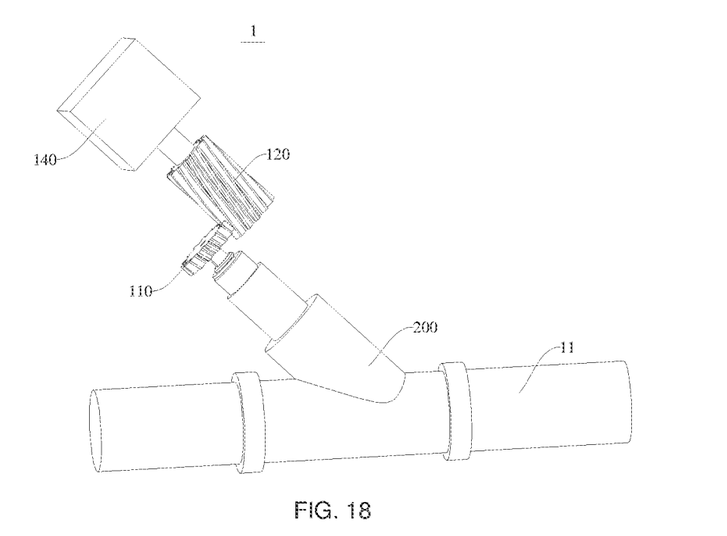
FIG. 18 is a mounting schematic view of the valve drive assembly in the embodiment of FIG. 16 of the present disclosure when the rotating shaft is inclined.
Figure 19:
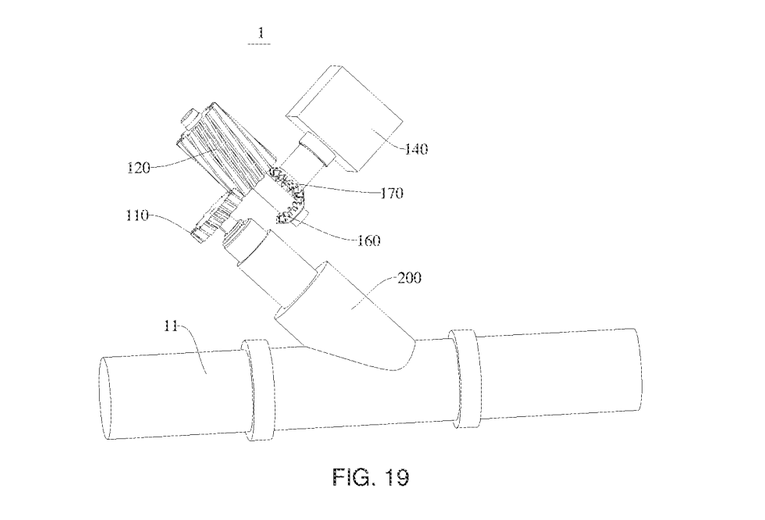
FIG. 19 is a mounting schematic view of the valve drive assembly in the embodiment of FIG. 17 of the present disclosure when the rotating shaft is inclined.

Of course, as mentioned above, when the rotating shaft 210 of the valve 10 is inclined relative to the pipeline 11, the valve drive assembly 100 can also be inclined accordingly, as shown in FIG. 18 and FIG. 19.

Figure 20:
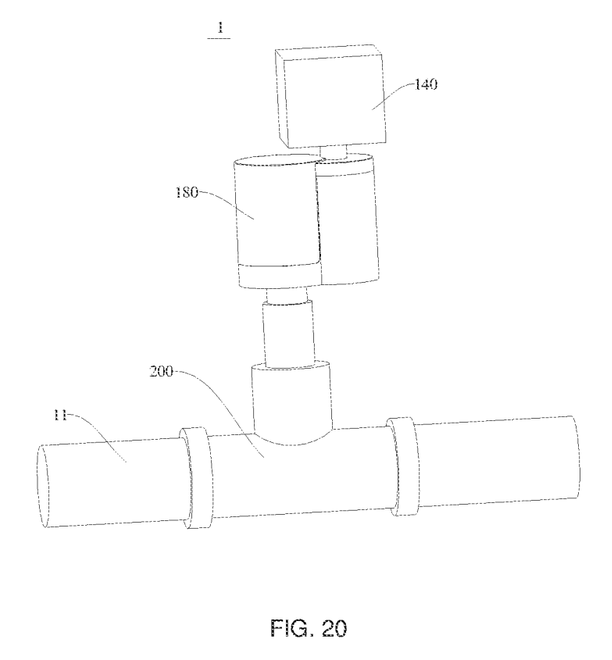
FIG. 20 is a schematic view of providing a housing for the valve in the embodiment of FIG. 16 of the present disclosure.

FIG. 20 is a schematic view of providing a housing 180 for the valve 10 in the embodiment of FIG. 16 of the present disclosure. As shown in FIG. 20, the valve drive assembly 100 may also include the housing 180, the first transmission part 110 and the second transmission part 120 are accommodated in the housing 180, so as to protect the first transmission part 110 and the second transmission part 120. Of course, in the various embodiments shown in FIG. 17 to FIG. 19, and even in other more optional embodiments, the housing 180 can also be provided to protect the transmission part. Optionally, the housing 180 can be fixed relative to the valve body 200 and fixedly connected to the driving part 140, thereby also playing the supporting role of the support part 150 in the embodiment of FIG. 1.

The valve drive assembly provided by the embodiments of the present disclosure includes the first transmission part, the second transmission part and the driving part, the first transmission part is configured to be detachably connected with the rotating shaft of the valve; the second transmission part is in transmission connection with the first transmission part, and can move in the axial direction of the rotating shaft relative to the first transmission part; the driving part is in transmission connection with the second transmission part, the driving part is configured to drive the second transmission part to rotate so as to drive the first transmission part and the rotating shaft of the valve to rotate. By enabling the first transmission part to move relative to the second transmission part in the axial direction of the rotating shaft, even if the rotating shaft rises and lowers in the axial direction during the rotation, the first transmission part moves therewith, and can always maintain cooperation with the second transmission part, thus realizing the transmission between the two. Therefore, the valve drive assembly provided by the embodiment of the present disclosure can be adapted to the axial displacement of the rotating shaft, and has better adaptability. The transmission part (first transmission part) provided by the embodiment of the present disclosure is applied to the above-mentioned valve drive assembly to achieve the above-mentioned beneficial effects.

The valve provided in the embodiment of the present disclosure, including the above-mentioned valve drive assembly, and the pipeline structure provided in the embodiment of the present disclosure, including the above-mentioned valve, both have the above-mentioned beneficial effects.

INDUSTRIAL APPLICABILITY

The transmission parts and the valve drive assemblies provided by the embodiments of the present disclosure can be adapted to the axial displacement of the rotating shaft of the valve during the rotation, have good adaptability, and have a stable structure and high reliability. With use of the above-mentioned valve drive assembly, the valve provided in the embodiment of the present disclosure can avoid the problem of restricted rotation caused by the rising and lowering of the rotating shaft during the rotation process, therefore the automatic opening and closing can be better realized.

What is claimed is:
1. A valve drive assembly, configured to drive a rotating shaft of a valve to rotate, wherein the valve drive assembly comprises:
   a first transmission part, wherein the first transmission part is configured to be detachably connected with the rotating shaft of the valve;
   a second transmission part, wherein the second transmission part is in transmission connection with the first transmission part, and is movable in an axial direction of the rotating shaft relative to the first transmission part; and a driving part, wherein the driving part is in transmission connection with the second transmission part, and the driving part is configured to drive the second transmission part to rotate, so as to drive the first transmission part and the rotating shaft of the valve to rotate;

wherein the second transmission part has a second hole, wherein the second transmission part is configured to be sheathed on an outer side of the first transmission part using the second hole, one of the outer side of the first transmission part and an inner side of the second transmission part is provided with a guide structure, the other is provided with a guide groove, wherein an extending direction of the guide groove is consistent with an extending direction of an axis of the rotating shaft, and the guide structure is in sliding fit with the guide groove;

wherein the first transmission part comprises a body and the guide structure protruding on an outer side of the body, the guide structure comprises a mounting column protruding on the outer side of the body and a roller arranged on the mounting column, and the guide structure is configured to extend into the guide groove so that the roller is capable of rolling on an inner wall of the guide groove.

2. The valve drive assembly according to claim 1, wherein the first transmission part is provided with a first hole in which the rotating shaft is inserted.

3. The valve drive assembly according to claim 1, wherein an outer peripheral side of the body is a cylindrical surface, and a plurality of guide structures are arranged at intervals around the outer peripheral side of the body.

4. The valve drive assembly according to claim 1, wherein the mounting column coincides with an axis of the roller, and is perpendicular to the axis of the rotating shaft.

5. The valve drive assembly according to claim 1, wherein an outer side of the second transmission part is provided with a clamping slot, the valve drive assembly also comprises a third transmission part, wherein the third transmission part is provided with a third hole, an inner side of the third hole is provided with a bulge, the third transmission part is sheathed on the outer side of the second transmission part using the third hole, and the bulge is matched with the clamping slot, and the third transmission part is in transmission connection with the driving part.

6. The valve drive assembly according to claim 5, wherein the second transmission part is cylindrical, the outer side of the second transmission part is provided with a plurality of clamping slots, wherein the plurality of clamping slots are arranged at intervals around an outer peripheral surface of the second transmission part, and the clamping slots extend along an axial direction of the second transmission part.

7. The valve drive assembly according to claim 5, wherein an outer side of the third transmission part is provided with a tooth surface, wherein the tooth surface is in transmission connection with the driving part.

8. The valve drive assembly according to claim 7, wherein the tooth surface of the third transmission part is a conical tooth surface.

9. The valve drive assembly according to claim 1, wherein the valve drive assembly further comprises a support part, wherein the support part is configured to connect a valve body of the valve and/or a pipeline provided with the valve, and the driving part is provided on the support part.

10. The valve drive assembly according to claim 9, wherein the support part is provided with an accommodating cavity, wherein the first transmission part and the second transmission part are accommodated in the accommodating cavity.

11. A valve, comprising the valve drive assembly according to claim 1.

* * * * *